(12) United States Patent
Halpap et al.

(10) Patent No.: US 7,736,553 B2
(45) Date of Patent: Jun. 15, 2010

(54) METHOD AND DEVICE FOR PRODUCING NANOPARTICLES

(75) Inventors: Joerg Halpap, Speyer (DE); Richard Van Gelder, Speyer (DE); Bernd Sachweh, Meckenheim (DE); Siegfried Welker, Hettenleidelheim (DE); Norbert Wagner, Mutterstadt (DE); Andreas Marquard, Karlsruhe (DE); Gerhard Kasper, Karlsruhe (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 828 days.

(21) Appl. No.: 11/631,964

(22) PCT Filed: Jul. 8, 2005

(86) PCT No.: PCT/EP2005/007406

§ 371 (c)(1),
(2), (4) Date: Jan. 9, 2007

(87) PCT Pub. No.: WO2006/005536

PCT Pub. Date: Jan. 19, 2006

(65) Prior Publication Data

US 2007/0262482 A1    Nov. 15, 2007

(30) Foreign Application Priority Data

Jul. 9, 2004    (DE) ................... 10 2004 033 320

(51) Int. Cl.
*B29B 9/00*    (2006.01)

(52) U.S. Cl. .................. 264/10; 264/483; 264/484; 264/485; 264/80; 425/6; 425/174; 425/174.8 R; 425/174.8 E

(58) Field of Classification Search .......... None
See application file for complete search history.

(56) References Cited

U.S. PATENT DOCUMENTS

| 4,528,006 A | 7/1985 | Vitovec et al. |
| 5,186,872 A | 2/1993 | Nishiwaki et al. |
| 2004/0009118 A1* | 1/2004 | Phillips et al. ........... 423/592.1 |

FOREIGN PATENT DOCUMENTS

| DE | 41 21 119 A1 | 1/1992 |
| DE | 199 61 966 A1 | 7/2001 |
| EP | 0 343 796 A2 | 11/1989 |
| JP | 63031534 A | 2/1988 |
| SU | 1018910 A | 5/1983 |
| WO | WO 03/039716 A1 | 5/2003 |

OTHER PUBLICATIONS

N. A. Fuchs, "On the Stationary Charge Distribution on Aerosol Particles in a Bipolar Ionic Atmosphere", Geofisica pura e applicata, vol. 56, 1963, pp. 185-193.

* cited by examiner

*Primary Examiner*—Mary Lynn F Theisen
(74) *Attorney, Agent, or Firm*—Oblon, Spivak, McClelland, Maier & Neustadt, L.L.P.

(57) ABSTRACT

The invention relates to processes for producing nanoparticles, especially pigment particles, comprising the following steps: i) bringing a base substance (1) into the gas phase, ii) generating particles by cooling or reacting the gaseous base substance (1), and iii) applying electrical charge to the particles during particle generation in step ii) in a nanoparticle generation apparatus. The invention further relates to apparatus for producing nanoparticles, having a feed line (28) for transporting the gas stream (29) into the apparatus, a particle generation and charging area for substantially simultaneous generation and charging of nanoparticles, and a takeoff line (30) for transporting the charged nanoparticles from the particle generation and charging area.

28 Claims, 4 Drawing Sheets

METHOD AND DEVICE FOR PRODUCING NANOPARTICLES

Figure 1:
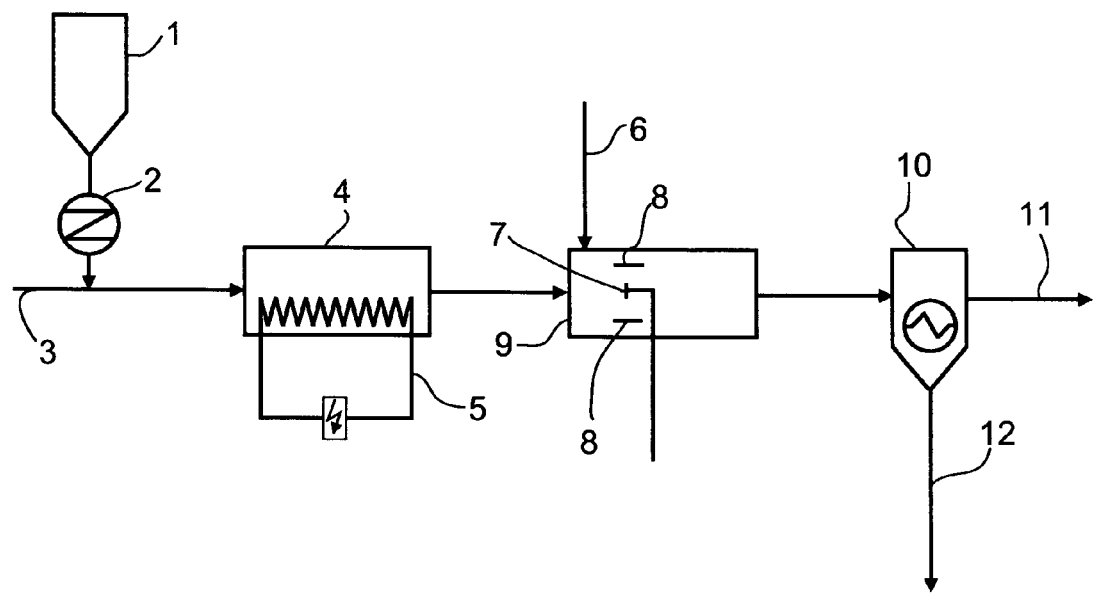

The invention relates to a process and apparatus for producing nanoparticles by substantially simultaneous particle generation and charging of the particles of a gaseous compound present in a gas stream.

One field in which nanoparticles are produced and used relates to pigments of the kind employed for coloring in paints for example. Decreasing particle size in the case of pigments is accompanied for example by improvement in the brightness and color strength of the paints.

Another area in which nanoparticles are used relates to catalysts. Thus, as the mean particle diameter decreases, the overall surface area of the catalyst, relative to the mass, is increased, so resulting in a more effective catalyst.

Additionally the use of nanoparticles in the area of pharmaceutical products or crop protection agents allows their bioavailability to be increased.

In the case of materials which are applied in vapor form to a substrate in the production process it is advantageous if the particles are very fine in order that they may be brought more rapidly into the gas phase, thereby allowing the thermal load to be reduced.

Nanoparticulate solids can be produced by a variety of processes. Commonly these pulverulent solids are generated by means of grinding steps, reactions in the gas phase, in a flame, by crystallization, precipitation, sol-gel operations, in a plasma or by desublimation. Not only the generation but also the subsequent formulation play a decisive part in the tailoring of product properties such as, for example, ready redispersibility and color strength in the case of pigments. Particles with a diameter of less than 1 μm have a particularly strong agglomeration tendency and must therefore be stabilized and placed in a state from which they can be processed further (redispersed, for example) with maximum ease.

WO 03/039716 relates to apparatus and a process for producing nanoparticulate pigments, in which a pigment precursor material is evaporated and subsequently condensed and collected in a collecting liquid.

EP-A 0 343 796 describes a process for producing pigment dispersions. For that purpose first of all a pigment or an intermediate in pigment production is evaporated in the presence of an inert gas stream, if using intermediates for pigment production a further gas stream is added, comprising substances necessary for the intermediates to react to pigments. The gas stream is led into a liquid in which the pigment vapor undergoes desublimation to form fine pigment particles. The pigment particles remain in the liquid and so form a dispersion.

A process for preparing quinacridone by vapor-phase dehydrogenation of dihydroquinacridone is known from U.S. Pat. No. 3,097,805. The vaporous quinacridone formed in the process is cooled by admixing a cold gas stream, so that nanoparticles are formed.

DE 41 211 19 A1 displaces a process for producing fine particles of a material by evaporating the material in an inert gas. The material is evaporated in an evaporation vessel and the fine particles are generated by cooling the evaporated material in the inert gas, which is blown from the evaporation vessel into the evaporated material. The fine particles are deposited on the surface of the evaporation vessel and subsequently removed.

Agglomeration of nanoparticles can be prevented for example by applying a coating. JP 63031534A describes a process in which an organic substance is heated in the presence of an inert gas and evaporated. The gaseous organic substance subsequently forms hyperfine particles on a solid surface. The particles are given a coating in order to effect easy dispersibility.

The electrostatic charging of nanoparticles as a sufficient measure for preventing agglomeration has not hitherto been considered by the art, since the assumption has been that small particles can only take on very few elementary charges. From Fuchs, N. A. (1963) On the stationary charge distribution on aerosol particles in a bipolar ionic atmosphere, Geofisica pura e applicata 56, 185 to 193, it is apparent that a particle having a diameter of 35 nm can take on only 1.4 elementary charges on average.

DE 199 61 966 A1 relates to a process for converting crude organic pigments into a pigment form suitable for application, by subliming the crude pigment and desubliming the evaporated pigment. The crude pigment is sublimed by supplying energy to it briefly and is desublimed by quenching in a time ranging from $10^{-5}$ to 1 s. The temperature reduction for desublimation is accomplished by admixing colder gaseous or liquid components. Proposals for preventing aggregation of the pigment particles include, in addition to other measures, the electrostatic charging of the desublimed pigment particles. Electrostatic charging as an exclusive measure to prohibit agglomeration is not mentioned. Additionally the particles are charged in the desublimed state, so that agglomeration during the formation of the particles is not prevented. Products produced by this process hence still always contain a large number of agglomerates.

Agglomeration impairs the properties gained by virtue of the nanoscale. Agglomerates, for example, of color pigments used in printing inks, paints, other coatings and plastics have adverse effects on the color properties, in particular on the color strength and gloss after processing of the color pigments.

It is an object of the present invention to provide a process and apparatus for producing nanoparticles, by means of which agglomeration of nanoparticles which have been generated, especially nanoparticles which have been formed by desublimation, is largely prevented. The process and apparatus ought to be suitable in particular for industrial application and also ought largely to prohibit nanoparticle agglomeration and ensure a narrow particle size distribution even when the particles are generated at high temperatures, such as by desublimation of the gaseous compound, for example, when flow is turbulent, and when there is a high mass throughput.

This object is achieved in accordance with the invention by means of a process for producing nanoparticles, comprising the following steps:
 i) bringing a base substance (1) into the gas phase,
 ii) generating particles by cooling or reacting the gaseous base substance (1), and
 iii) applying electrical charge to the particles during particle generation in step ii).

This object is further achieved by apparatus for producing nanoparticles, by substantially simultaneous particle generation and charging of the particles of a gaseous compound present in a gas stream, comprising
 a feed line for transporting the gas stream into the apparatus,
 a particle generation and charging area for generation of charged nanoparticles, and
 a takeoff line for transporting the charged nanoparticles from the particle generation and charging area.

By nanoparticles in this context are meant nanoparticulate solids and liquid droplets having a particle diameter <1 μm.

It has surprisingly been found that nanoparticles, especially hot nanoparticles, can be electrostatically charged directly with a charge sufficient to prevent agglomeration, during formation from the (hot) gas phase. The process of the invention utilizes this finding by including a process step in which electrical charge is applied to the particles during particle generation. The apparatus of the invention utilizes this finding by including a particle generation and charging area in which substantially simultaneous particle generation and charging can take place. The advantage of this construction and of this process is that they allow tailoring of product properties with little scatter in the physical variable being adjusted (for example, narrow particle size distribution, low agglomerate fraction) and at the same time ensure a high quality standard. Improved product properties are for example brightness, color, purity, evaporability, and solubility.

Besides formation of the nanoparticles by cooling, in particular by desublimation, it is also possible for the nanoparticles to be formed, for example, by a reaction in which a solid or liquid product is formed. For this purpose preferably at least two reactant substances are supplied to an oven, and are heated in the oven to reaction temperature. These reactant substances may be solid, liquid or gaseous. In the nanoparticle production apparatus the reactant substances react with one another to form nanoparticles. In order to prevent the individual nanoparticles undergoing agglomeration with one another they are electrostatically charged substantially at the same time as they are formed, in the nanoparticle production apparatus.

Desublimation in the context of this invention is the conversion of a gaseous substance into a solid substance by cooling (condensation). It is a process opposite to sublimation.

Charging of the particles is accomplished preferably by attachment of ions. Charging may, however, also take place by other particle-charging methods known to the skilled worker, such as electron impact ionization, for example. In addition to the charging of the nanoparticles by the electric field which is generated with a spray electrode, charging may also take place through supply of an ion-containing cooling-gas stream. In this case the ions present in the cooling-gas stream attach to the nanoparticles and so lead to their charging. In order to prevent the nanoparticles agglomerating it is necessary here as well that all the ions have a unipolar charge.

The particle generation and charging area of the apparatus of the invention further includes preferably an electrode arrangement suitable for corona discharge, comprising at least one spray electrode and at least one counterelectrode. In the case of an arrangement of electrodes of which one (the spray electrode) has a much smaller radius of curvature than the other (counterelectrode) and in which the distance between the electrodes is greater than the radius of curvature of the smaller electrode (for example, tip-plate, wire-plate, wire-tube), ionization of the gas takes place in the vicinity of the smaller electrode far below the breakdown field strength of the overall gap. This ionization is associated with a weak light emission and is called corona.

In one preferred embodiment of the present invention the spray electrode is the cathode and the counterelectrode is the anode. In simplified terms the generation of ions then takes place such that the high field strength in the immediate vicinity of the straying electrode strongly accelerates electrons present in the gas toward the counterelectrode. The accelerated electrons collide with the neutral gas molecules, so producing positive gas ions and further electrons by impact ionization. The positive gas ions are accelerated toward the spray electrode, where they impinge and, in so doing, give off further electrons. An avalanche of electrons is produced which moves toward the counterelectrode. Further away from the cathode the field strength and the energy of the electrons decrease, so that no further positive gas ions are formed. Electrons are attached to gas molecules, and so negative gas ions are formed. The negatively charged gas ions migrate to the counterelectrode and collide with the desublimed particles of solid, and, in so doing, attach to them. By means of this process the nanoparticles are charged in the particle generation and charging area of the apparatus of the invention.

The feed line of the apparatus of the invention may be a tube which is flanged on directly to a heating section, where a compound to be deposited in the form of a nanoparticulate solid, or a precursor material of such a compound, is sublimed.

The gas stream entering the apparatus of the invention preferably comprises not only the compound to be produced in nanoparticle form but also at least one carrier gas, preferably at least one carrier gas which is inert to the compound.

The invention further provides a process for producing nanoparticles, comprising the following steps:

I) metering a base substance into an oven,
II) bringing the base substance into the gas phase,
III) generating particles by cooling the gaseous base substance, by supplying a cooling-fluid stream whose temperature is below the condensation temperature or desublimation temperature of the base substance, and
IV) applying electrical charge to the particles during particle generation in step III).

The unipolar charging of the particles largely prevents them agglomerating to larger particles even during the operation of generating the particles.

In one preferred embodiment of the process of the invention the base substance is metered into a carrier-gas stream and supplied together with the carrier gas to the oven. Base substance in this context is the substance from which the nanoparticles are generated by sublimation and desublimation or by a chemical reaction. The base substance may be in the form, for example, of a solid or a liquid. In solid form the base substance may be pulverulent or granular, for example.

The base substance in solid form is metered into the carrier-gas stream with, for example, a commercially available brush metering means, such as the rotating brush generator RBG 1000 from Palas GmbH. The carrier gas used is preferably a gas which does not react with the base substance. Examples of suitable gases include nitrogen, carbon dioxide, and noble gases.

In a further embodiment of the process of the invention the carrier gas is preheated. To preheat the carrier gas it is preferred to use heat exchangers. Examples of suitable heat transfer media include thermal oils, condensing steam or salt melts. Besides indirect heating in a heat exchanger, the carrier gas may also be heated directly, for example, in a metal melt.

If nonpreheated carrier gas is used the carrier gas is heated together with the base substance in the oven.

The oven in which the base substance is brought into the gas phase is preferably operated continuously. Continuous ovens traversed by a flow of the medium to be heated have the advantage that the medium is subjected only briefly to thermal stress. Evaporation of the base substance may take place, for example, in a fluidized bed with inert fluidized material (quartz or alumina, for example), with heating taking place preferably by means of heat exchangers situated in the fluidized bed, or by means of ovens where the walls are heated from the outside. Ovens where the walls are heated from the outside are for example tube furnaces. Heating of the walls is generally accomplished electrically, using flames, salt melts or metal melts. To evaporate the base substance it is preferred to use tube furnaces with electrical heating.

In order to obtain a uniform temperature distribution within the oven, the oven is preferably subdivided into at least three heating zones. The individual heating zones can be supplied with a different volume of heat in dependence on the degree of evaporation of the base substance. Thus, for example, at the oven's inlet, when no base substance has yet been evaporated, a greater volume of heat is necessary, in order to hold the temperature in the oven at evaporation temperature, than at the end of the oven, when the major part of the base substance has already been evaporated. As soon as the base substance has evaporated a further supply of heat means that the evaporated base substance heats up further and can decompose.

In order to achieve uniform evaporation and a uniform thermal load, particularly on heat-sensitive base substance, the temperature in the oven is preferably regulated such that the lowest temperature in the oven is not more than 20% lower than the highest temperature occurring in the oven.

In order to ensure only a brief thermal load, particularly on heat-sensitive base substance, the flow rate of the carrier-gas stream containing the base substance is preferably chosen such that the residence time in the oven is not more than 10 s, preferably not more than 1 s and more preferably not more than 0.1 s. The residence time of the base substance in the oven should also be adapted to the thermal stability of the base substance.

In order to improve the flow regime within the oven it is possible for baffles or guide elements to be arranged in the oven. The arrangement of the guide elements or baffles reduces the flow cross section and thus increases the flow rate. At the same time the use of the baffles or guide elements rectifies the flow.

In counterdistinction to heat-sensitive base substance, in the case of base substance which is thermally insensitive it is unnecessary to set a uniform temperature profile and a short residence time in the oven.

In order to be able to realize appropriately short residence times in which the base substance is fully evaporated it is necessary for the base substance supplied to the oven to be already in a size-reduced form. Size reduction can be effected using, for example, commercially customary mills, such as impact mills, bore mills, opposed jet mills, spiral jet mills or any other mills known to the skilled worker. Preference is given to using impact mills, spiral jet mills or opposed jet mills.

In order to prevent brief severe thermal stressing of the base substance by contact with the oven walls, in one preferred version of the process the carrier-gas stream containing the base substance in the oven is surrounded by a sheathing-gas stream. Suitable sheathing gases, in the same way as for carrier gases, are gases which are inert toward the base substance. The sheathing gas is supplied to the oven preferably by way of gas supply nozzles distributed around the oven's periphery. In one preferred embodiment the gas supply nozzles are aligned in such a way that the sheathing gas is supplied to the oven in parallel with the oven walls. This prevents the sheathing gas mixing fully with the carrier gas containing the base substance as soon as it enters.

In another preferred embodiment the oven walls are formed from a porous sintered material via which the sheathing gas is supplied to the oven. The porous sintered walls ensure a uniform supply of the sheathing gas over the entire length of the oven. By this means it is possible reliably to prevent contact between the base substance and the oven walls.

In another embodiment the base substance is supplied to the oven in the form of a suspension in an evaporable solvent. The solvent evaporates in the oven, so that it is possible to forego the addition of a further carrier gas. In order to prevent the base substance reacting with the solvent it is necessary to choose a solvent which is inert toward the base substance even at high temperatures. One example of a suitable solvent is water.

When evaporating a suspension containing the base substance it is also advantageous to use a sheathing-gas stream in the oven in order to prevent base substance coming into contact with the oven walls.

In one embodiment of the process of the invention the gaseous base substance is desublimed by sudden severe cooling to form a large number of individual nanoparticles. To effect cooling it is preferred to add a cooling gas which is inert toward the base substance. The cooling gas used, for example, is nitrogen, carbon oxide or a noble gas. The cooling gas is preferably the same gas as the carrier gas.

In order to obtain particles having a mean diameter of preferably less than 0.3 μm it is necessary for desublimation to take place in less than 1 s, preferably in less than 0.1 s. Rapid cooling can be achieved, for example, by adding precooled cooling gas. Thus, for example, for rapid cooling nitrogen can be added in the form of liquid nitrogen with a temperature of below −195.8° C. Also conceivable is the addition of any desired other cooling gases that are inert toward the nanoparticles and have temperatures of below 0° C. or in their liquid form. A further acceleration of cooling can be achieved by greatly reducing the flow cross section in the apparatus for desublimation and charging, and so increasing the flow rate.

In a further embodiment of the present invention nanoparticles are formed from the base substance by chemical reaction. These nanoparticles are preferably cooled by adding an inert cooling gas. Instead of the inert cooling gas, however, it is also possible to add a further gaseous reactant for producing the nanoparticles.

In order to prevent the charged nanoparticles flowing in the direction of the at least one counterelectrode it is possible to surround the at least one counterelectrode with a flow of a sheathing gas, so that the charged nanoparticles are entrained in the gas flow and do not reach the at least one counterelectrode. It is also possible to arrange the at least one counterelectrode outside of the nanoparticle production apparatus and to give the walls themselves a negative charge. Because of the negatively charged walls the likewise negatively charged nanoparticles are repelled and so remain in the carrier-gas stream.

In the case of walls made from electrically neutral but electrically conductive material it is also necessary to avoid contact of the charged nanoparticles with the wall, since such contact would lead to the charges being transferred from the particle to the wall. This neutralizes the nanoparticles, which can then be agglomerated. Such contact can be prevented, for example, again through the use of a sheathing gas.

The sheathing gas is supplied to the apparatus of the invention preferably by way of gas supply nozzles distributed around the periphery of the apparatus. In one preferred embodiment the gas supply nozzles are aligned such that the sheathing gas is supplied to the apparatus parallel to the walls.

In another preferred embodiment the walls of the apparatus are formed from a porous sintered material. The sheathing gas is then supplied via the pores of the sintered-metal walls, uniformly over the periphery and the length of the particle generation and charging area.

Correspondingly, in the case of positively charged nanoparticles, in one preferred embodiment the walls of the nanoparticle production apparatus are likewise positively charged, in order to prevent the charged nanoparticles being attracted by the walls. In the case of positively charged nanoparticles as well this effect can be intensified by using a sheathing-gas stream.

To increase operational reliability and to prevent physical harm by electrical shock on contact with the walls it is possible in many applications only to use a sheathing gas, without electrical charging of the walls, in order to prevent nanoparticles contacting the wall.

In one preferred embodiment of the process of the invention the electrically charged nanoparticles are separated off in an electrostatic precipitator. A suitable electrostatic precipitator is any commercially available electrostatic precipitator. Examples thereof include electrostatic precipitators from Künzer or from Lurgi.

If the nanoparticles are to be dispersed in a liquid, separation of the nanoparticles from the carrier-gas stream is preferably effected using a wet electrostatic precipitator, in which the nanoparticles are deposited into a liquid film. The liquid film comprising the nanoparticles is collected in a collecting vessel. In order to concentrate the dispersion the liquid already comprising nanoparticles can be recirculated to the wet electrostatic precipitator, with the liquid then picking up further nanoparticles.

Besides separation in wet or dry electrostatic precipitators, the separation of the particles from the carrier-gas stream can also take place by means of conventional gas filters, such as bag filters, or, when preparing a dispersion, by means of gas scrubbers, Venturi scrubbers for example.

If separation takes place in an electrostatic precipitator or in a conventional gas filter the nanoparticles can either be stored in dry powder form or processed further or else, after deposition, can be dispersed in a liquid.

If the particles are dispersed in a liquid it is preferred to add additives to the liquid in order to stabilize the dispersion. Examples of suitable additives for stabilizing the pigment dispersion include dispersants, e.g., cationic surface-active additives, or anionic surface-active additives based on sulfonates, sulfates, phosphonates or phosphates or carboxylates, or nonionic surface-active additives based on polyethers. Dispersants of this kind are available for example from the companies Lubrizol, Byk Chemie, EFKA or Tego. Mixtures of additives are also possible.

The nanoparticles can be alternatively stabilized against agglomeration by combining the charged particles with oppositely charged aerosol droplets. The aerosol droplets are composed of a liquid and one or more additives serving for stabilization. As a result of the opposite charge the nanoparticles and the aerosol droplets attract one another, and so collide. As a result of the high temperature which still prevails the liquid evaporates, so that the additives from the aerosol droplet remain on the surface of the nanoparticles and so substantially prevent nanoparticle agglomeration.

In one embodiment of the present invention there is disposed between the oven and the nanoparticle production apparatus a first particle separator, in which unevaporated portions are separated off. Such portions are, for example, impurities which do not evaporate at the temperatures prevailing in the oven, or else base substance which owing to the short residence time in the oven has not evaporated fully. A hot electrostatic filter, a sintered metal filter, a plane filter, a bag filter or an absolute filter of another construction for example can be used as the particle separator.

The solids separated off in the first particle separator may be supplied, for example, to the oven again in order to achieve full evaporation. In that case recycling to the oven takes place preferably after the unevaporated base substance has been cooled. Besides recycling to the oven, the unevaporated base substance can also be returned to the mill or the metering means. It is also possible to remove the separated solids from the process, so as, for example, to free the operation from impurities.

In a further embodiment of the present invention there is downstream of the nanoparticle production apparatus a second particle separator, in which gaseous impurities are separated off. The gaseous impurities may be supplied, for example, as waste gas to a gas scrubber. In one preferred embodiment a cold gas stream is added to the nanoparticles which have not yet been fully cooled, which have been discharged in the second particle separator, for the purpose of further cooling. A suitable gas here is again any gas which is inert toward the nanoparticles. Preferred gases are nitrogen, carbon dioxide or noble gases. Preference is given to the same gas as the cooling gas used in the means for desublimation and charging and/or the same gas as the carrier gas.

The temperature at which the carrier-gas stream containing the nanoparticles is supplied to the second particle separator for separation of gaseous impurities is preferably below the desublimation temperature of the nanoparticles and above the desublimation or condensation temperature of the impurities.

Improved desublimation of the gaseous base substance to nanoparticles in the nanoparticle production apparatus can be achieved by adding unevaporable substances, or a substance with a higher desublimation temperature, to the carrier gas into which the base substance is metered, said first substances acting as desublimation nuclei. It is also possible to admix the cooling gas with already-solidified nuclei of the base substance from which the nanoparticles are formed. The added nuclei are preferably smaller than the nanoparticles to be produced.

In one particularly preferred version of the process the base substance is brought into the gas phase and desublimed under atmospheric pressure.

In one preferred embodiment of the apparatus of the invention the particle generation and charging area is a desublimation and charging area for generating charged nanoparticles, having a gas supply for supplying a cooling fluid whose temperature is lower than that of the gas stream. In another preferred embodiment the particle generation and charging area is a reaction and charging area suitable for the course of chemical reactions for generating nanoparticles.

The invention accordingly also provides, in particular, apparatus for producing nanoparticles, especially nanoparticulate pigments, by substantially simultaneous desublimation and charging of a gaseous compound present in a gas stream, comprising a feed line for transporting the gas stream into the apparatus, a desublimation and charging area for generating charged nanoparticles, with a gas supply for supplying a cooling fluid, whose temperature is lower than that of the gas stream, and with an electrode arrangement suitable for a corona discharge, comprising a spray electrode and a counterelectrode, and a takeoff line for transporting the charged nanoparticles from the desublimation and charging area.

The desublimation and charging area of the apparatus of the invention comprises a gas supply for supplying a cooling fluid whose temperature is lower than that of the gas stream (the fluid being a quenching gas, for example). The gas stream comprising the at least one carrier gas and the gaseous compound is cooled by the supply of cooling fluid to a temperature lower than the sublimation temperature of the compound and hence is desublimed, in other words brought into the solid state. This produces very fine particles with a narrow size distribution.

In the case of the present invention the temperature of the cooling fluid supplied is below the sublimation temperature of the compounds to be desublimed. The temperature of the cooling fluid is preferably at least 10° C., more preferably between 100 and 700° C., very preferably between 500 and 650° C. lower than the temperature of the gas stream containing the gaseous compound. The ratio of the volume of gas supplied to the desublimation and charging area to the cooling fluid per unit time is preferably between 10:1 and 1:100, more preferably 1:1.

The cooling fluid and/or the gas stream preferably comprise, as carrier gas, at least one gas selected from the group consisting of air, carbon dioxide, noble gases, and nitrogen.

In one preferred embodiment of the apparatus of the invention a porous tube concentrically surrounds the spray electrode in the desublimation and charging area, the design of the porous tube being such that it forms the gas supply for the cooling fluid.

The cooling fluid passes through the porous wall of the tube into the tube interior, in which the gas containing the compound to be desublimed is guided and in which there is a spray electrode for a corona discharge. The porous tube wall may also function as a grounded counterelectrode, against which a corona is maintained when a high DC voltage is applied to the spray electrode. The cooling-fluid stream flowing through the porous tube wall into the tube interior serves as a cooling gas stream which condenses the gaseous compound and thus causes particle formation. Additionally, by "blowing out" the counterelectrode (if the porous tube serves as such) the cooling-fluid stream prevents deposition of the charged particles on the counterelectrode and the consequent unwanted losses of particles in the desublimation and charging area. The charged particles can therefore pass to a deposition site which is intended for deposition, which may follow the desublimation and charging area.

In another embodiment of the present invention the porous tube concentrically surrounding the spray electrode serves merely to supply cooling fluid, and there is an additional counterelectrode to the spray electrode.

The porous tube is preferably surrounded by an annular space for supplying the cooling fluid. By way of the annular space the cooling fluid flows around the outside of the porous tube and passes through the pores in the porous tube into the hot gas stream which flows around the spray electrode and which comprises the compound to be desublimed, a pigment or a catalyst for example.

Examples of materials suitable for producing such porous tubes are porous sintered metals or sintered ceramics.

In one preferred embodiment of the present invention the electrode arrangement comprises a rod-shaped spray electrode provided at one end, an end which protrudes into the desublimation and charging area, with at least one radially extending wire. This wire is, for example, a temperature-stable platinum wire.

The diameter of said at least one wire is preferably between 20 and 200 μm. By means of this spray electrode arrangement the discharge is approximately punctiform. The wires serve as tips at which discharge can take place. They ensure uniform corona discharge.

In a preferred embodiment of the apparatus of the invention said apparatus comprises at least one displacement element, arranged at least partly in the porous tube in such a way that between the displacement element and the inner wall of the porous tube a flow gap is formed. The gas stream containing the compound to be desublimed flows through this flow gap between the displacement element and the inner wall of the porous tube, through which the cold cooling fluid enters the flow gap. By this means, in a short desublimation and charging area, a high cooling rate and thermodynamic homogenization are achieved. Nucleation within the annular-gap flow which comes about as a result leads to higher particle concentrations. Preferably there are two displacement elements, of which one is disposed in front of and one behind the spray electrode in the flow direction of the gas stream, or there are a multiplicity of displacement elements, disposed alternately with a multiplicity of spray electrodes in the flow direction of the gas stream.

In one preferred embodiment of the present invention the takeoff line which serves for transporting the charged nanoparticles from the particle generation or desublimation and charging area comprises, or opens out into, a deposition zone in which the charged nanoparticles are deposited. The nanoparticles can be deposited onto a solid medium or into a liquid medium. Deposition into a liquid medium may take place, for example, by means of a wet electrostatic precipitator. Deposition onto a solid medium may take place in a dry electrostatic precipitator or on a filter medium (woven fabric, felt, nonwoven . . . ). In order to minimize particle losses the site of particle deposition should follow the charging area as closely as possible.

The apparatus of the invention and the process of the invention are particularly suitable for converting thermally stable crude organic pigments into a pigment form suitable for application. Examples of suitable pigment classes include the following: phthalocyanine pigments, perylene pigments, perinone pigments, quinacridone pigments, indanthrone pigments, flavanthrone pigments, anthrapyrimidine pigments, pyranthrone pigments, violanthrone and isoviolanthrone pigments, anthanthrone pigments, anthraquinone pigments, quinophthalone pigments, dioxazine pigments, diketopyrrolopyrrole pigments, thioindigo pigments, isoindoline pigments, isoindolinone pigments and aniline black, monoazo pigments, disazo pigments, disazocondensation pigments, metal complex pigments and organometallic complexes in general (such as for OLEDs, for example), pyrazoloquinazolone pigments, C.I. Pigment Black 1 (aniline black), C.I. Pigment Yellow 101 (aldazine yellow), beta-Naphthol pigments, Naphthol AS pigments, benzimidazolone pigments, triarylcarbonium pigments, and C.I. Pigment Brown 22.

The pigment particles obtained by means of the apparatus of the invention or by means of the process of the invention are distinguished by their fineness, color strength and ease of dispersibility in application.

Besides the stated pigment classes the process is also suitable for producing very fine catalyst particles, which accordingly have a larger total surface area per unit mass and hence are much more effective. In the case of pharmaceutical products or crop protection agents the fineness, owing to the low size of the nanoparticles, may increase the bioavailability. An example of a pharmaceutical product on which the process can be used is ephedrin (chemical name: erythro-2-methylamino-1-hydroxy-1-phenylpropane; 2-methylamino-1-phenyl-1-propanol).

Suitable catalysts are for example DMPA (dimethylolpropionic acid) or TEDA (triethylenediamine), as catalysts for the production of polyurethane foams.

Further substances from which nanoparticles can be produced by the process of the invention are for example optical brighteners, such as Ultraphor, or crop protection agents such as BAS 600 F®.

Besides the production of nanoparticles the process is also suitable for separating off impurities. Thus, for example, in a particle separator disposed between the oven and the nanoparticle production apparatus, unevaporated particles of solids can be separated off from the gas stream. In a separator situated downstream of the nanoparticle production apparatus it is possible to remove impurities of higher volatility, which are still in gas form at temperatures below the desublimation temperature of the product. In this way a product can be obtained which is substantially free from impurities. This purification is possible for substances which are solid or liquid above the evaporation temperature of the product or are in gas form below the desublimation temperature of the product.

DRAWING

Figure 2:
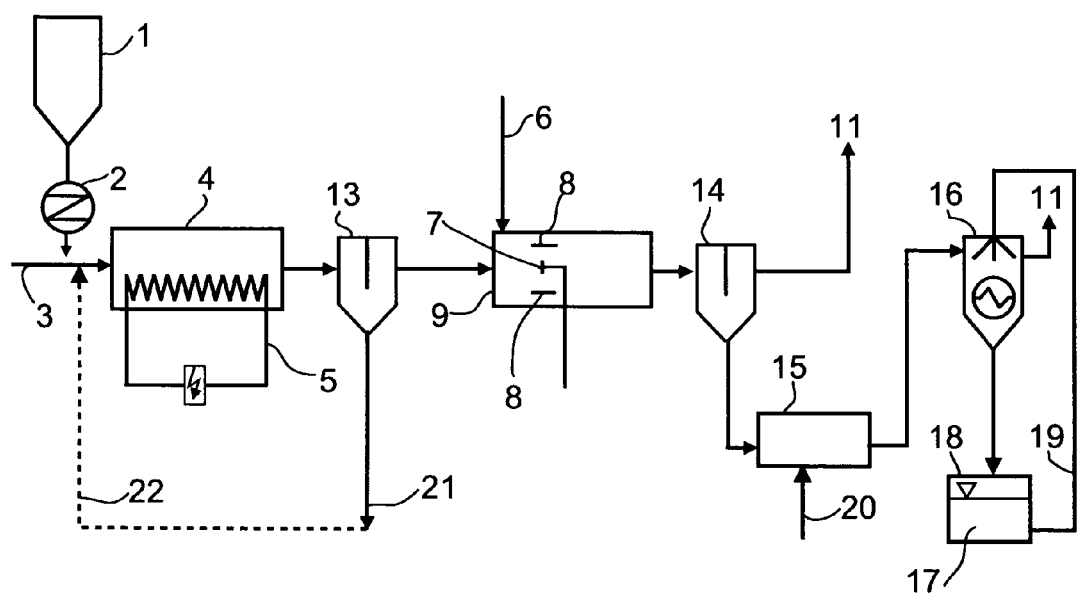
Figure 3:
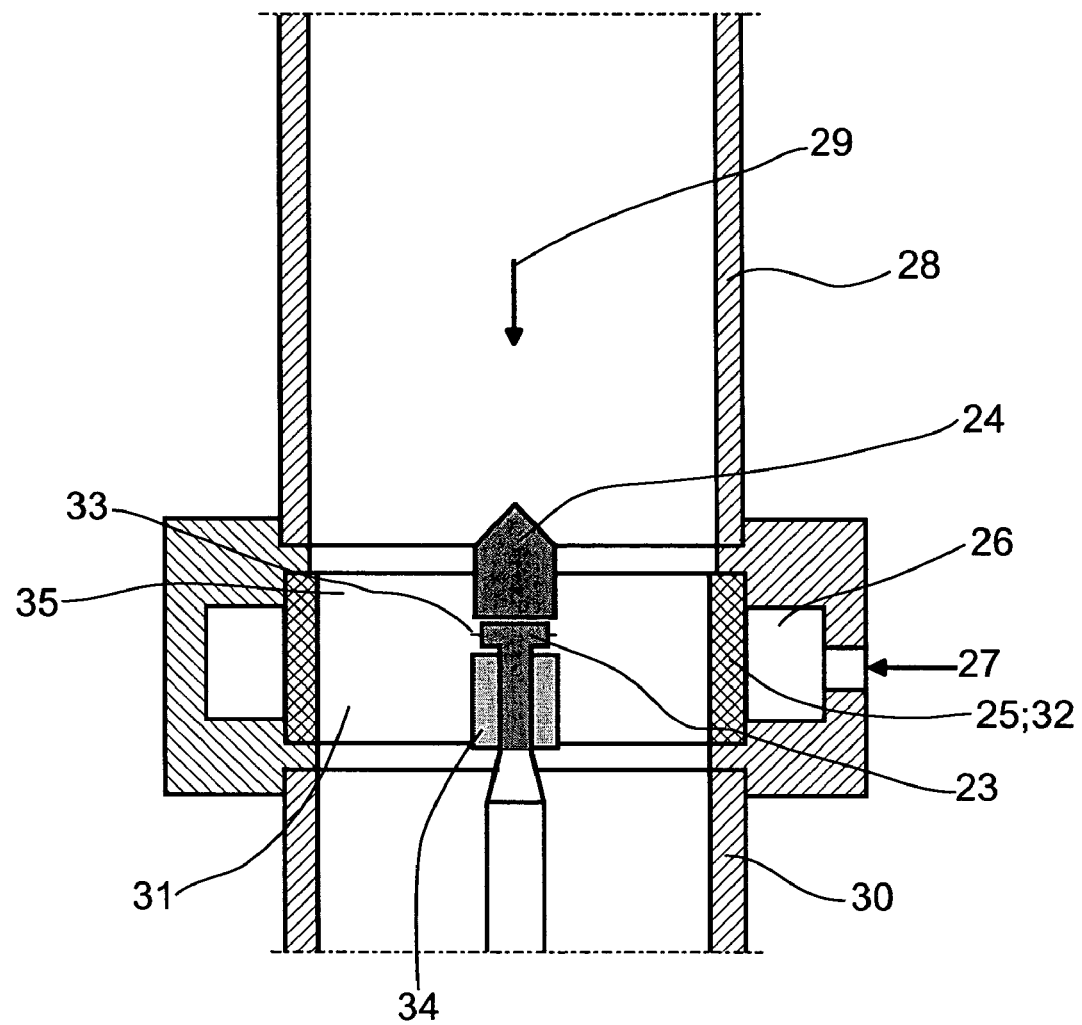
Figure 4:
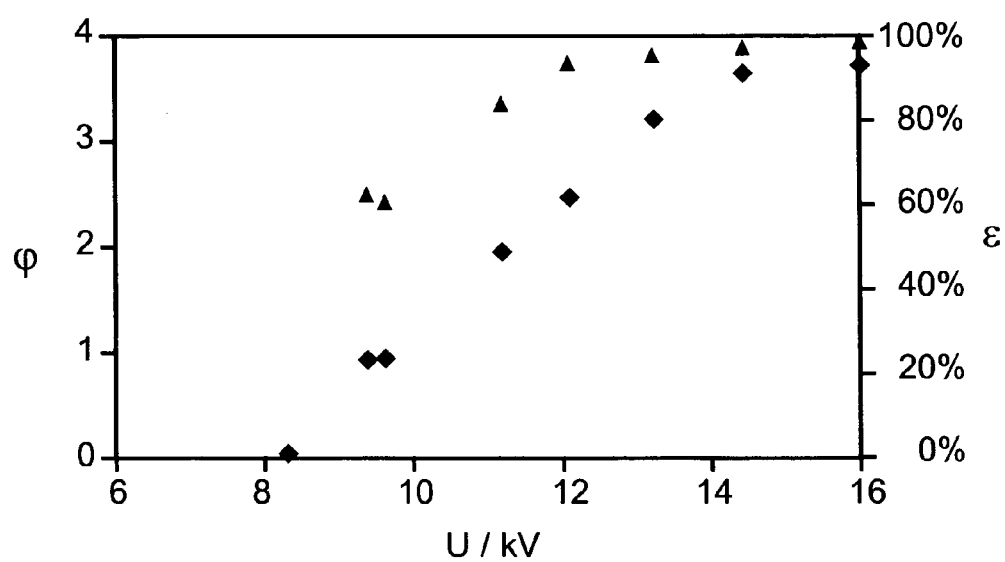

The invention is illustrated below with reference to the drawing, in which:

FIG. 1 shows a flow diagram of the process of the invention in a first embodiment, FIG. 2 shows a flow diagram of the process of the invention in a second embodiment, FIG. 3 shows a schematic diagram of apparatus of the invention for producing nanoparticles, and FIG. 4 shows a graph with the mean charge, efficiency and particle loss as a function of the corona voltage in apparatus of the invention.

FIG. 1 shows a flow diagram of the process of the invention in a first embodiment.

Base substance 1 is supplied from a reservoir via a metering means 2 to a carrier-gas stream 3, which is preferably inert toward the base substance 1. The base substance 1 is introduced in a reservoir vessel in the form, for example, of a powder or granules. Additionally it is possible to separate off the base substance 1 from a block, to reduce it in size and to meter it into the carrier gas 3. Besides the metering of the base substance 1 in solid form it is also possible to introduce the base substance 1 in a suspension.

In the case of base substance 1 in solid form the metering means 2 is preferably a brush metering means. It is, however, also possible to use any other suitable metering means 2 known to the skilled worker. Examples include metering troughs or injectors.

The carrier gas 3 which has been metered into the base substance 1, or the base substance 1 in suspension, is supplied (preferably in preheated form) to an oven 4. In one preferred embodiment the oven 4 is heated by electrical heating 5. In order to obtain a substantially homogeneous distribution of temperature within the oven 4, the oven 4 is preferably divided into two or more heating zones. An essentially homogeneous temperature distribution means here that the minimum temperature in the oven is not more than 20% below the maximum temperature in the oven 4. In the case of the embodiment depicted here the oven 4 is heated by three electrical heaters 5, corresponding to division of the oven 4 into three heating zones.

In the oven 4 the base substance 1 is brought into the gas phase. The carrier gas 3 containing the gaseous base substance 1 is supplied to a nanoparticle production apparatus 9. For sudden cooling of the carrier gas containing the gaseous base substance 1 the apparatus 9 is supplied with a cooling gas 6, in order to desublime the base substance 1 from the carrier gas 3, to form nanoparticles, or to form nanoparticles by chemical reaction and subsequent cooling. Suitable cooling gas 6 is any gas which is inert toward the base substance 1.

The cooling gas 6 is supplied to the nanoparticle production apparatus 9 by way for example of nozzles distributed around the periphery of the apparatus 9. Preferably, however, supply takes place via porous walls of the nanoparticle production apparatus 9. Where the cooling gas 6 is supplied by way of porous walls the cooling gas 6 acts simultaneously as a sheathing gas and so prevents nanoparticles which have formed from coming into contact with the walls and adhering to them.

In order to prevent agglomeration of individual nanoparticles with one another they are electrostatically charged as they are formed. For this purpose in one preferred embodiment a spray electrode 7 is accommodated within the nanoparticle production apparatus 9. Arranged between the spray electrode 7 and along the walls of the nanoparticle production apparatus 9 are counterelectrodes 8. Between the spray electrode 7 and the counterelectrodes 8 an electrical field is formed in which the gas is ionized between the spray electrode 7 and the counterelectrodes 8, by emission of electrons from the spray electrode 7. When the nanoparticle-containing gas stream flows through the electrical field, charges attach to the nanoparticles by means of diffusion charging, and so these nanoparticles become electrostatically charged. In the case of unipolar charging the individual nanoparticles repel one another, thereby preventing agglomeration.

The temperature and the quantity of the cooling gas supplied has been chosen so that, for organic pigments, for example, within the cooling section a cooling of preferably 300° C. per 10 mm to 10° C. per 10 mm is set. The cooling rate can be raised by an improved isolation (for example with quartz plates) between the oven and the quench. Furthermore, the cooling rate can be raised noticeably by adiabatic relaxation, for example by means of a Laval nozzle.

By virtue of the nanoparticles being charged during their formation, the agglomeration of individual nanoparticles to form larger particles is prevented.

In addition to the charging of the nanoparticles by electrons given off by a spray electrode 7, charging can also be effected by adding ion-containing cooling gas to the nanoparticle production apparatus 9.

The particle-containing gas stream is supplied from the nanoparticle production apparatus 9 to an electrostatic precipitator 10. In the electrostatic precipitator 10 the charged nanoparticles are separated off from the gas stream. The charged nanoparticles are taken off as product 12 from the electrostatic precipitator 10 and can be supplied for further processing. The gas stream, in the form of waste gas 11, is preferably supplied to a waste-gas-purification means, not shown here, and emitted to the environment after cleaning.

Besides the electrostatic precipitator 10, suitability for separating off the charged nanoparticles from the gas stream is also possessed by a wet electrostatic precipitator, in which the nanoparticles are dispersed into a liquid film, or by a gas filter, a bag filter for example, in which the charged nanoparticles are retained by the filter bags and can be cleaned off from the filter bags later on. A combination of different apparatuses (for example in serial connection) (for example a Venturi washer in front of an electrostatic precipitator) is possible for an amelioration of the degree of deposition.

FIG. 2 shows a flow diagram of the process of the invention in a second embodiment.

As in the case of the process version depicted in FIG. 1, here again the base substance 1 is metered via a metering means 2 into a carrier gas 3 and supplied together with the carrier gas 3 to an oven 4. The oven 4 is preferably heated by electrical heaters 5, but can also be heated by means of heat transfer media, such as salt melts or metal melts, for example.

With the embodiment depicted in FIG. 2 as well the oven 4 is divided into three heating zones, each heated by its own electrical heater 5. The division of the oven 4 into individual heating zones allows a substantially homogeneous temperature distribution to be realized in the oven 4.

In the oven 4 sufficient heat is supplied so that the base substance 1 evaporates. After the oven the carrier-gas stream 3 comprising the evaporated base substance 1 is supplied to a first particle separator 13. In the first particle separator 13 unevaporated substances are separated off. Unevaporated substances may, for example, be impurities which evaporate at a temperature higher than that prevailing in the oven 4. The unevaporated substance may also comprise base substance 1 which owing to the particle size is not fully evaporated during the residence time of the base substance 1 in the oven 4. Solids 21 separated off in the first particle separator 13 are discharged from the first particle separator 13. If the discharged solids 21 include unevaporated base substance 1, the solids 21 are preferably resupplied to the oven 4 via a solids return means 22. The solids return means 22 may for this purpose open out directly into the oven 4 or into the supply means of the carrier gas 3 containing base substance 1. The solids return means 22 can be cooled, in order to prevent thermal decomposition in the case of high residence time and temperature.

The gas stream purified of solids 21 in the first particle separator 13 is supplied to the nanoparticle production apparatus 9. In the apparatus 9 nanoparticles are formed from the gaseous base substance 1. During their formation the resultant particles are electrostatically charged, in order to prevent agglomeration. The electrostatic charging takes place, as depicted in FIG. 2, via a corona discharge at the spray electrode 7. The charging mechanism of the particles corresponds to the process described in FIG. 1.

In order, in the event of purification, to prevent any impurities present in the gas stream from desubliming or condensing out within the apparatus 9, the gas stream is cooled to a temperature which is below the desublimation temperature of the base substance 1 and above the desublimation or condensation temperature of the impurities. The gas stream comprising the product in the form of nanoparticles is supplied to a second particle separator 14, in which the nanoparticles are separated from the gas stream. Gaseous impurities still present are separated off together with the gas stream emerging as waste gas 11 from the second particle separator 14. The product, in the form of nanoparticles, is supplied to a cooling means 15 for further cooling. The cooling means 15 is supplied with a cooling gas 20 which is inert toward the product. A suitable cooling gas is, for example, nitrogen or carbon dioxide, although noble gases such as argon or water, which evaporates to steam, can also be used, for example. From the cooling means 15 the gas stream comprising the product is supplied to a wet electrostatic precipitator 16. In the wet electrostatic precipitator 16 the charged nanoparticles are dispersed in a liquid film. The nanoparticle-containing dispersion 17 is supplied to a collecting vessel 18. In order to concentrate the dispersion 17, in other words to disperse further nanoparticles into the dispersion, the dispersion 17 is resupplied via a circulation stream 19 to the electrostatic precipitator 16. Further particles then deposit in the dispersion within the electrostatic precipitator 16. The gas cleaned of its nanoparticles in the wet electrostatic precipitator 16 is taken off as waste gas 11. The waste gas 11 can be supplied to a waste gas purification means for further treatment before being emitted to the environment.

In addition to the process version depicted here, where the nanoparticles are dispersed into a liquid in a wet electrostatic precipitator 16, the charged nanoparticles can also be separated off—as already depicted in the process in FIG. 1—in an electrostatic precipitator or else in a gas filter, a bag filter for example, from the gas stream. Also possible is the separation of the nanoparticles with a wet scrubber.

If the nanoparticles are not deposited into a dispersion it is possible, in order to enable long-term storage without nanoparticle agglomeration, to coat the nanoparticles with a surface-active substance after they have been separated off from the gas stream. This is necessary in particular on account of the fact that the nanoparticles become discharged again and hence no longer repel one another.

FIG. 3 shows diagrammatically an apparatus of the invention for producing nanoparticles.

The apparatus comprises an oven tube, which acts as a feed line 28, a desublimation and charging area 31, and a waste-gas tube which serves as a takeoff line 30. A gas stream 29 comprising a compound flows into the feed line 28 (e.g. 40 l/min). The desublimation and charging area 31 comprises an electrode arrangement 23, 25, comprising a spray electrode 23 and a counterelectrode 25. The counterelectrode 25 is formed by a porous tube 32 which is composed of a grounded sintered metal. The diameter of the tube 32 is for example 40 mm, its length for example 20 mm. The spray electrode 23 is composed of a thin rod whose end is provided, at the level of the porous tube 32 in which it is centrally disposed, with (six, for example) fine platinum wires 33 (diameter 40 µm) which are clamped in radially.

A cooling fluid 27 enters the annular space 26 (e.g. 40 l/min) and flows around the porous tube 32. Through the pores of the porous tube 32 the cooling fluid 27 passes into the desublimation and charging area 31, in which it acts as a cooling gas which condenses a gaseous compound in the gas stream 29 from hot gas and so causes nanoparticles to form. The cooling fluid 27 serves further to blow out the porous tube 32 which serves as counterelectrode 25, in order to prevent particle losses by deposition on the inside of the tube. It is also possible together with the cooling fluid 27 to supply a further substance in vapor form (for example a coating substance), which at appropriate condensation temperatures is condensed heterogeneously onto the nanoparticles as the particles travel to the deposition zone (which is not shown).

The apparatus of the invention further comprises two displacement elements 24, 34, of which the first, 24, is arranged in front of the spray electrode 23, and the second, 34, behind the spray electrode 23, in the flow direction of the gas stream 7. As a result a flow gap 35 is formed between the displacement elements 24, 34 and the inner wall of the porous tube 32, through which the gas flow 7 flows in the course of its cooling by the cooling fluid 27, with charging of the desublimed particles by the negative corona discharge. The flow gap 35 has, for example, a width of 15 mm.

FIG. 4 shows a graph with the mean particle discharge and the efficiency as a function of the corona voltage in an apparatus of the invention.

To this end, nanoscale particles of Heliogenblau® (blue copper phthalocyanines from BASF AG) were investigated at low concentrations at 25° C. in the apparatus (without the desublimation step). Two variables determined as a function of the corona voltage were calculated as follows:

1. Efficiency:

$$\varepsilon = 1 - \frac{C_{out,neutral}}{C_{out,total}},$$

where $C_{out,neutral}$ is the concentration of the neutral particles which pass by an electrical separator connected to the apparatus, with a high voltage applied, and $C_{out,total}$ is the particle concentration emerging from the desublimation and charging area, and 2. Mean charge:

$$q = \frac{I_{FCE}}{e \cdot C_{out,total} \cdot \dot{V}_{FCE}}$$

where $I_{FCE}$ is the particle charge current measured in a Faraday cup electrometer, e is the elemental charge, and $\dot{V}_{FCE}$ is the volume flow through the Faraday cup electrometer.

In FIG. 4 the efficiency values ε calculated from measurements are shown as small dark triangles and the mean charge q is shown in the form of black diamonds. The height of the efficiency values/loss values can be read off from the right-hand ordinate and the level of the values of the mean charge from the left-hand ordinate.

The polydisperse Heliogenblau® particles (d=35 nm, $\sigma_g$=1.5; c=$10^6$ #/cm$^3$) was drawn off under suction about 20 cm downstream of the charging zone.

The charge plotted in the figure (mean charge and efficiency) begins with increasing corona voltage somewhat below 8 kV, then climbs steeply until finally opening out into a saturation at above 14 kV.

Despite a short residence time in the charging zone (approximately 0.5 s) and a mean particle size of 35 nm, with only four charges per particle very high values are achieved, which according to the approximation formula of Batel (1972) come close to the anticipated saturation charge in the case of theoretically infinitely long residence time in the case of diffusion charging. Thus it has been shown that in apparatus of the invention it is possible to charge nanoparticles more quickly than expected. This charging serves to prevent agglomeration during the production of nanoparticles. Experiments were conducted, using the apparatus of the invention, on influencing agglomeration by charging. The experiments, carried out at about 290° C. and at a particle concentration of approximately 4×$10^8$ #/cm$^3$, document a significant inhibition of agglomeration. The greater the charging, the higher the concentration and the smaller the mean particle size. Moreover, with increasing stabilization, the particle size distribution measured came closer to the form of a Gaussian distribution.

EXAMPLES

Example 1

The nanoscale Pigment Red 179 was formulated by feeding a milled crude pigment with a mean particle size of 15 μm into an N$_2$ stream of 1 m$^3$/h by means of a commercially customary brush metering means. The N$_2$ stream containing the milled crude pigment is heated to 600° C. in a 3-zone oven, in the course of which the pigment is fully sublimed. Subsequently the sublimate is cooled by coaxial introduction (through nozzles) of 1 m$^3$/h N$_2$ of a temperature of 20° C., the pigment undergoing desublimation to form nanoparticles. At the same time the resultant particles are charged by way of a high-voltage electrode arranged centrally in the region of the nitrogen injection nozzles. The gas stream is cooled to a temperature of below 100° C. and passed into a wet electrostatic precipitator. Within the wet electrostatic precipitator, fully deionized water is conveyed in circulation and concentration is carried out by depositing the charged nanoparticles which form. Stabilization is effected by adding Solsperse 27000 from Lubrizol as a dispersing additive to the fully demineralized water.

Example 2

A crude pigment product based on P. B. 15:1, containing conventional impurities from synthesis, is purified by feeding the milled crude pigment ($x_{50}$=15 μm) into an N$_2$ stream (1 m$^3$/h (stp)) by means of a brush metering means (RBG 1000 from Palas). The N$_2$ stream containing the crude pigment is heated to 600° C. in a 3-zone oven, with a narrow temperature profile, the material undergoing full sublimation. Afterwards the sublimate is directed across a plane filter, where the solid impurities are left on the filter. Subsequently the sublimate is cooled by coaxial introduction of N$_2$ (1 m$^3$/h (stp), 20° C.) through nozzles. This leads to the desublimation of the product of value. This product of value is deposited in an electrostatic precipitator (Delta Profimat, Künzer) at 200° C. Determination of the amounts of substances of value have shown that a significant increase in the amount of substances of value of the base material by up to 6% is possible.

| | List of reference numerals |
|---|---|
| 1 | Base substance |
| 2 | Metering means |
| 3 | Carrier gas |
| 4 | Oven |
| 5 | Electrical heating |
| 6 | Cooling gas |
| 7 | Spray electrode |
| 8 | Counterelectrode |
| 9 | Nanoparticle production apparatus |
| 10 | Electrostatic precipitator |
| 11 | Waste gas |
| 12 | Product |
| 13 | First particle separator |
| 14 | Second particle separator |
| 15 | Cooling means |
| 16 | Wet electrostatic precipitator |
| 17 | Dispersion |
| 18 | Collecting vessel |
| 19 | Circulation stream |
| 20 | Cooling gas |
| 21 | Solids |
| 22 | Solids return |
| 23 | Spray electrode |
| 24 | First displacement element |
| 25 | Counterelectrode |
| 26 | Annular space |
| 27 | Cooling fluid |
| 28 | Heated feed line |
| 29 | Gas stream |
| 30 | Takeoff line |
| 31 | Desublimation and charging area |
| 32 | Porous tube |
| 33 | Platinum wires |

-continued

| List of reference numerals | |
|---|---|
| 34 | Second displacement element |
| 35 | Flow gap |

We claim:

1. A process for producing nanoparticles, comprising the following steps:
   i) bringing a base substance into the gas phase,
   ii) generating particles by cooling or reacting the gaseous base substance, and
   iii) applying electrical charge to the particles during particle generation in step ii) in a nanoparticle generation apparatus.

2. The process according to claim 1, wherein said generation of particles by cooling the gaseous base substance takes place by supplying a cooling-fluid stream whose temperature is below the condensation temperature or desublimation temperature of the base substance.

3. The process according to claim 1, wherein the base substance is metered into a carrier-gas stream which is inert toward the base substance and is supplied to an oven which serves for bringing a base substance into the gas phase.

4. The process according to claim 3, wherein the carrier-gas stream is preheated.

5. The process according to claim 3, wherein the oven is divided into at least three heating zones.

6. The process according to claim 3, wherein the minimum temperature in the oven is not more than 20% below the highest temperature in the oven and wherein the residence time of the base substance in the oven is not more than 10 s.

7. The process according to claim 3, wherein the carrier-gas stream containing the base substance in the oven is surrounded by a sheathing-gas stream.

8. The process according to claim 1, wherein the charge is applied to the nonparticles by corona discharge or by supplying an ion-containing cooling-gas stream.

9. The process according to claim 1, wherein the walls of the nanoparticle production apparatus and the particles have a unipolar charge or wherein an inert sheathing gas flows along the walls of the nanoparticle production apparatus.

10. The process according to claim 1, wherein the electrostatically charged nanoparticles are separated off in an electrostatic precipitator.

11. The process according to claim 10, wherein the particles are deposited into a liquid in a wet electrostatic precipitator.

12. The process according to claim 3, wherein disposed between the oven and the nanoparticle production apparatus is a first particle separator in which unevaporated substance is separated off.

13. The process according to claim 1, wherein the nanoparticles generated are dispersed in a liquid.

14. The process according to claim 13, wherein additives are added to the dispersion for the purpose of stabilizing and the dispersion is circulated for the purpose of concentration.

15. The process according to claim 1, wherein the nanoparticles generated are combined with oppositely charged aerosol droplets comprising additives.

16. The process according to claim 1, wherein downstream of the nanoparticle production apparatus is a second particle separator in which gaseous impurities are separated off from the product stream at a temperature below the desublimation temperature of the base substance and above the desublimation temperature/condensation temperature of the impurities.

17. Apparatus for producing nanoparticles, by substantially simultaneous desublimation and charging of a gaseous compound present in a gas stream, comprising
   a feed line for transporting the gas stream into the apparatus,
   a particle generation and charging area for substantially simultaneous generation and charging of nanoparticles, and
   a takeoff line for transporting the charged nanoparticles from the particle generation and charging area.

18. The apparatus according to claim 17, wherein the particle generation and charging area includes an electrode arrangement suitable for corona discharge, comprising at least one spray electrode and at least one counterelectrode.

19. The apparatus according to claim 17, wherein the particle generation and charging area is a desublimation and charging area having a gas supply for supplying a cooling fluid, whose temperature is lower than that of the gas stream, or is a reaction and charging area suitable for the course of chemical reactions for generating nanoparticles.

20. The apparatus according to claim 19, wherein a porous tube concentrically surrounds the spray electrode in the desublimation and charging area, the design of the porous tube being such that it forms the gas supply for the cooling fluid.

21. The apparatus according to claim 20, wherein the design of the porous tube is such that it forms the counterelectrode to the spray electrode.

22. The apparatus according to claim 20, wherein the porous tube is surrounded by an annular space for supplying the cooling fluid.

23. The apparatus according to claim 20, wherein the porous tube is a sintered-metal or sintered-ceramic tube.

24. The apparatus according to claim 19, wherein the cooling fluid and/or the gas flow comprises as carrier gas at least one gas selected from the group consisting of air, carbon dioxide, noble gases and nitrogen.

25. The apparatus according to claim 18, wherein the electrode arrangement comprises a rod-shaped spray electrode provided at one end, an end which protrudes into the particle generation and charging area, with at least one radially extending, electrically conductive wire.

26. The apparatus according to claim 20, comprising at least one displacement element arranged at least partly in the porous tube so that between the displacement element and the inner wall of the porous tube a flow gap is formed.

27. The apparatus according to claim 26, comprising two displacement elements of which one is disposed in front of and one behind the spray electrode in the flow direction of the gas stream.

28. The apparatus according to claim 17, wherein the takeoff line includes a deposition zone or opens out into a deposition zone in which the charged nanoparticles can be deposited onto a solid medium or into a liquid medium.

* * * * *